(12) United States Patent
Choi

(10) Patent No.: US 11,958,412 B2
(45) Date of Patent: Apr. 16, 2024

(54) STRUCTURE AND METHOD FOR MOUNTING FLAG-TYPE SIDE MIRROR

(71) Applicants: HYUNDAI MOTOR COMPANY, Seoul (KR); KIA CORPORATION, Seoul (KR)

(72) Inventor: Je-Won Choi, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/895,744

(22) Filed: Aug. 25, 2022

(65) Prior Publication Data

US 2022/0402432 A1 Dec. 22, 2022

Related U.S. Application Data

(62) Division of application No. 16/807,933, filed on Mar. 3, 2020, now Pat. No. 11,458,894.

(30) Foreign Application Priority Data

Aug. 6, 2019 (KR) ........................ 10-2019-0095559

(51) Int. Cl.
  *B60R 1/06* (2006.01)
  *B62D 65/02* (2006.01)
(52) U.S. Cl.
  CPC .............. *B60R 1/06* (2013.01); *B62D 65/024* (2013.01)
(58) Field of Classification Search
  CPC ......... Y10T 92/49947; Y10T 92/49826; Y10T 92/53; Y10T 29/53; B60R 1/06; B60R 1/12; B60R 11/00; B60R 16/0215; B60R 2011/004; B60R 16/0222; B60R 1/072; B60R 1/074; B62D 65/024; B60J 5/0416; B60J 5/044; B60J 5/0468; B60J 5/0404;
  (Continued)

(56) References Cited

U.S. PATENT DOCUMENTS 4,394,066 A 7/1983 Sharp
4,405,173 A 9/1983 Piano
(Continued)

FOREIGN PATENT DOCUMENTS

DE 102013010006 B3 12/2014
DE 202017100683 U1 3/2017
(Continued)

*Primary Examiner* — Sarang Afzali
*Assistant Examiner* — Darrell C Ford
(74) *Attorney, Agent, or Firm* — Lempia Summerfield Katz LLC (57) ABSTRACT

A structure and method for mounting a flag-type side mirror securely fastens the flag-type side mirror on a door panel of a vehicle. The method includes: passing a wiring mounted to the flag-type side mirror through through-holes formed in an outer belt rail, a quadrant reinforce, and an inner panel of the door; placing the flag-type side mirror at a position to be installed; arranging a mirror neck of the flag-type side mirror to abut on the quadrant reinforce through an outer panel of the door; passing a fastening member through the outer belt rail and the quadrant reinforce; and fastening the fastening member to an end of the mirror neck by operating a tool in a direction from inside to outside of the vehicle.

2 Claims, 13 Drawing Sheets

(58) Field of Classification Search
CPC . B60J 5/0436; B60Y 2304/05; B60Y 2304/07
USPC ............. 29/525.01, 700, 428; 349/841, 877; 296/1.11
See application file for complete search history.

(56) References Cited

U.S. PATENT DOCUMENTS

| | | | |
|---|---|---|---|
| 5,721,646 A * | 2/1998 | Catlin | B60R 1/088 359/872 |
| 2004/0121820 A1* | 6/2004 | Unno | B60R 1/06 455/569.2 |
| 2004/0129853 A1* | 7/2004 | Suzuki | B60R 1/06 248/475.1 |
| 2006/0038421 A1* | 2/2006 | Vijaywargiya | B60J 5/0404 296/1.11 |
| 2012/0119892 A1* | 5/2012 | Foote | B60R 1/0602 340/425.5 |
| 2013/0088037 A1* | 4/2013 | Schurter | B60J 5/0483 49/506 |
| 2015/0138658 A1* | 5/2015 | Nishimura | B60R 1/06 359/871 |
| 2015/0239399 A1* | 8/2015 | Tonar | B32B 17/10036 359/267 |
| 2018/0134219 A1* | 5/2018 | Kurihara | G02B 7/185 |

FOREIGN PATENT DOCUMENTS

| | | |
|---|---|---|
| FR | 2944484 A1 | 10/2010 |
| JP | 2001239834 A | 9/2001 |
| JP | 2014069651 A | 4/2014 |
| KR | 100633298 B1 | 10/2006 |
| WO | 2019107268 A1 | 6/2019 |

* cited by examiner

STRUCTURE AND METHOD FOR MOUNTING FLAG-TYPE SIDE MIRROR

CROSS-REFERENCE TO RELATED APPLICATION

This application is a divisional application of non-provisional U.S. patent application Ser. No. 16/807,933, filed on Mar. 3, 2020, which claims priority to and the benefit of Korean Patent Application No. 10-2019-0095559, filed on Aug. 6, 2019, the entire contents of each of which are incorporated herein by reference.

FIELD

The present disclosure relate to a side mirror of a vehicle; and, particularly, to a structure and method for mounting flag-type side mirror on a door panel.

BACKGROUND

The statements in this section merely provide background information related to the present disclosure and may not constitute prior art.

In order for a user to keep an eye on the rear or rear lateral side of a vehicle during traveling, side mirrors are mounted on the sides of the vehicle.

Conventionally, quadrant-type side mirrors mounted on quadrants of front doors have become mainstream. However, for sporty and dynamic design in recent years, flag-type side mirrors mounted on door panels of a vehicle are proliferating.

Figure 1:
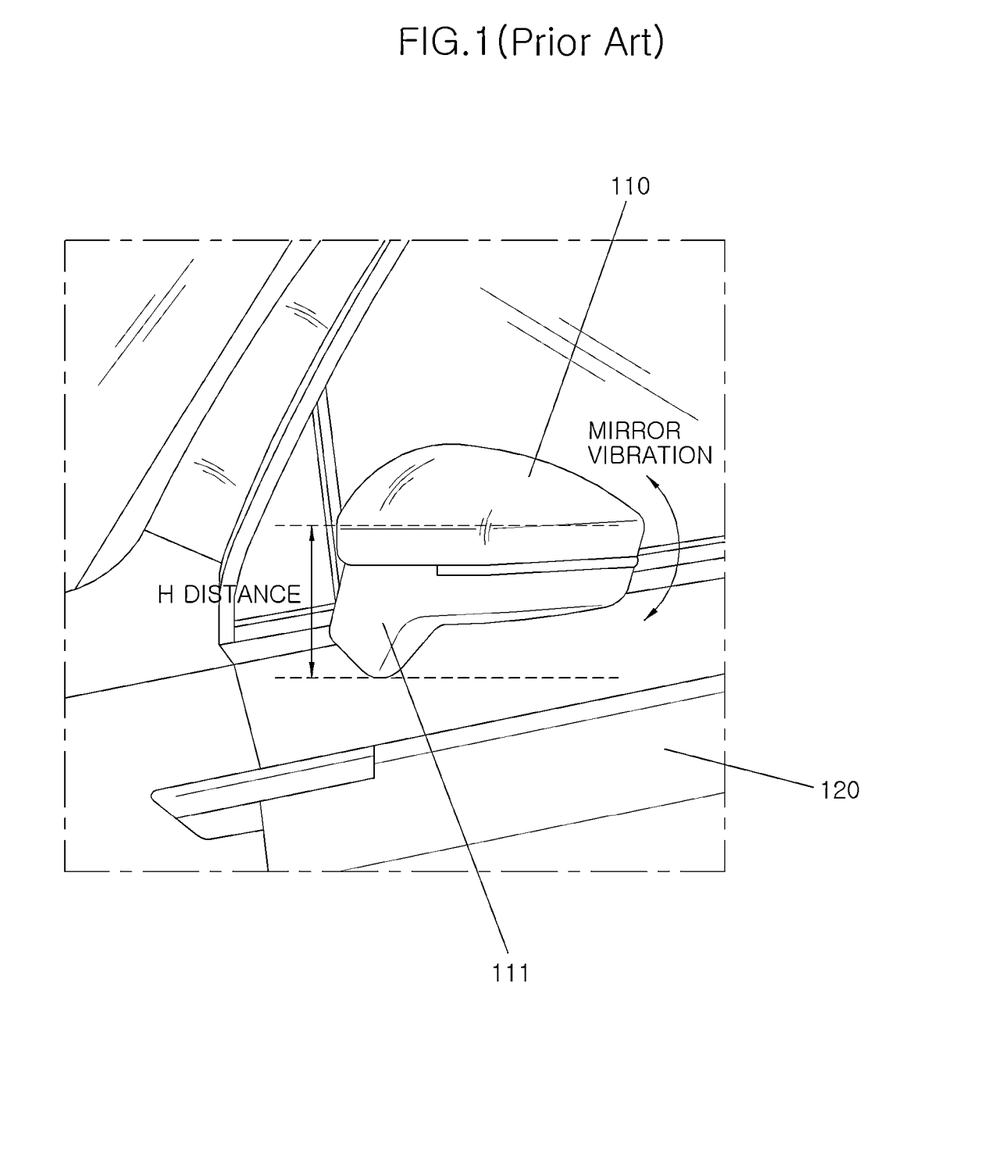
FIG. 1 is a perspective view illustrating a state in which a flag-type side mirror is mounted.
Figure 2:
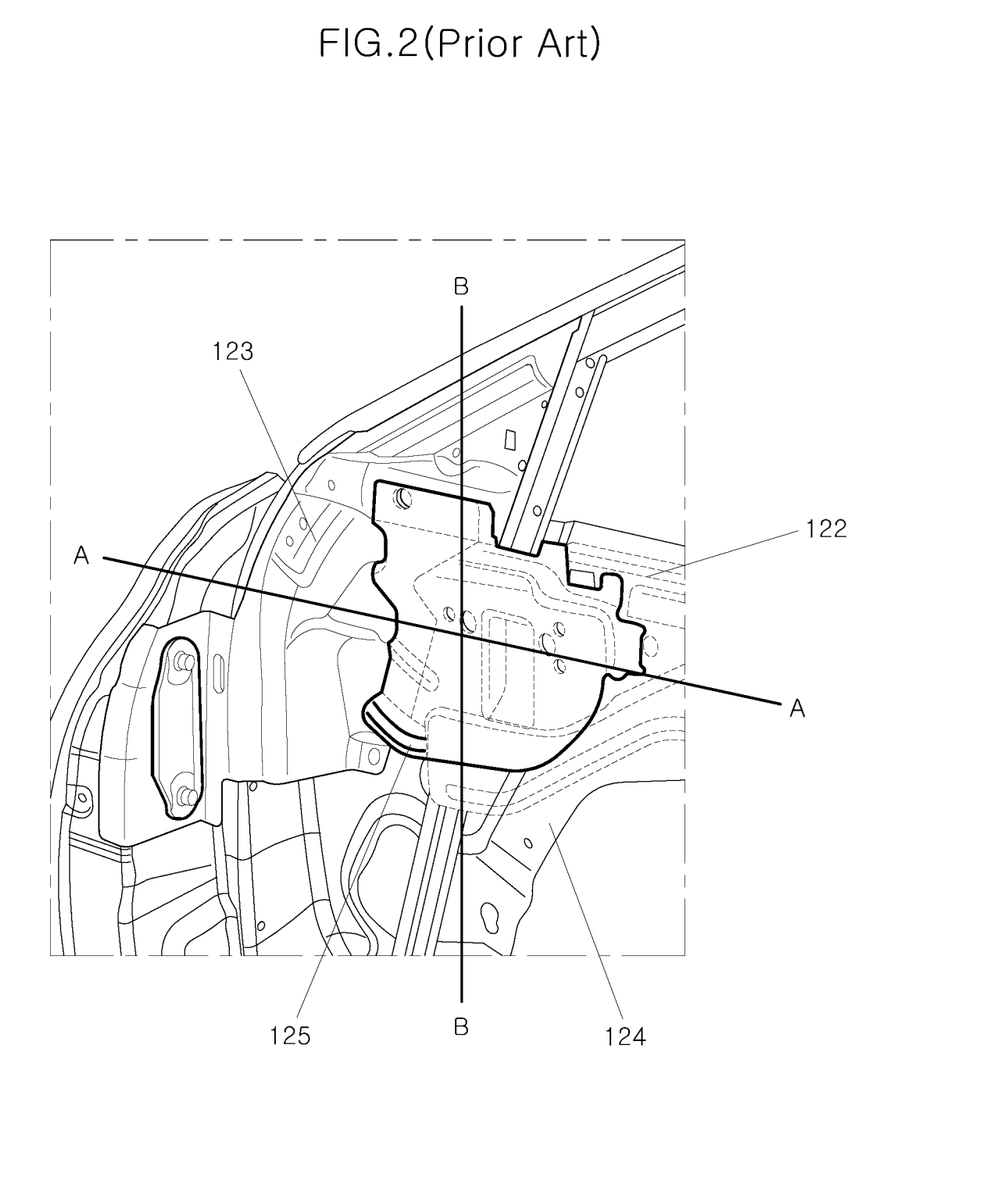
FIG. 2 is a perspective view illustrating a portion to which a conventional flag-type side mirror is mounted.

As illustrated in FIG. 1, in a flag-type side mirror 110, a mirror neck 111 has a long length (H distance) since the center of gravity of the side mirror is spaced apart from the position at which the side mirror 110 is fastened to a door panel.

Hence, the conventional flag-type side mirror 110 may vibrate when a door 120 is opened or closed or while a vehicle is traveling at a high speed.

Figure 3:
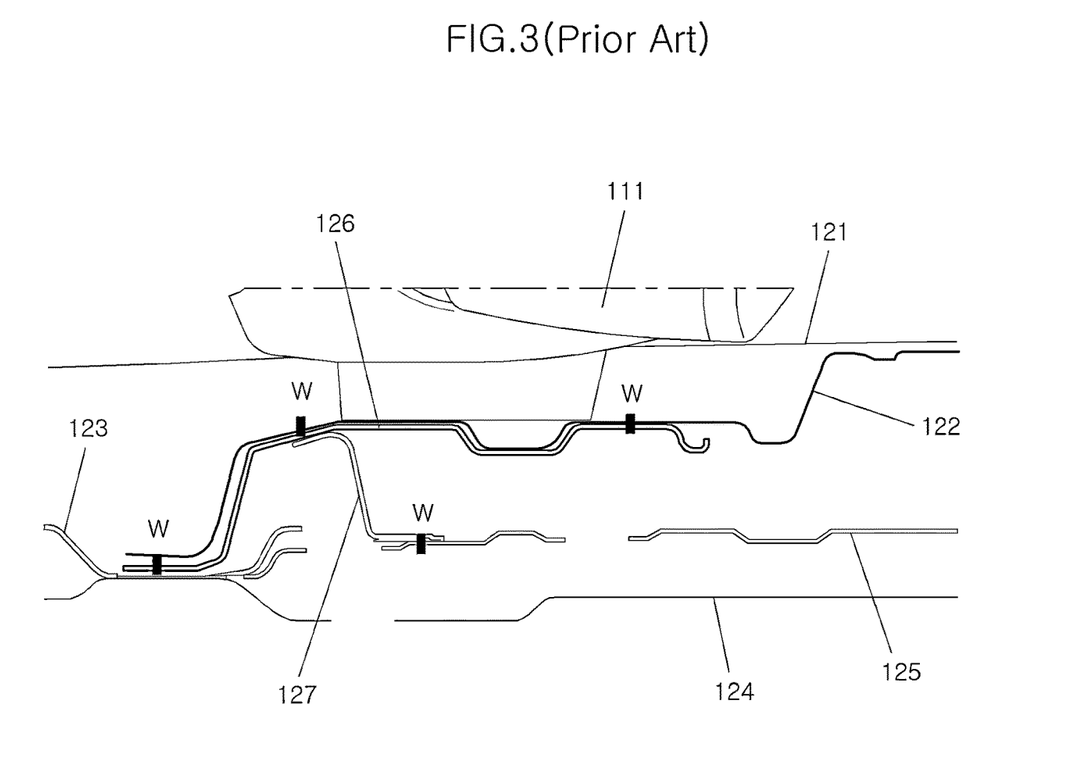
FIG. 3 is a cross-sectional view taken along line A-A of FIG. 2.

In addition, as illustrated in FIG. 3, in the structure in which the side mirror 110 is fastened to the panel of the door 120, a portion to which the side mirror 110 is fastened is open in cross-section at one side thereof.

An outer panel 121 and an inner panel 124 are provided at the upper end of an outer belt rail 122 and the upper end of an inner belt rail 125, respectively, and include a mirror bracket 126, which connects a quadrant reinforce 123 to the outer belt rail 122, and an auxiliary bracket 127, which connects the mirror bracket to the inner belt rail 125, which are bonded to each other by welding W or the like. The end of the mirror neck 111 of the side mirror 110 is then positioned at a portion in which the mirror bracket 126 is positioned, and a fastening bolt is fastened to the mirror bracket 126 through the mirror neck 111, the outer panel 121, and the outer belt rail 122 from the outside of the vehicle.

In this case, since only one side of the outer belt rail 122 is connected to only one side of the inner belt rail 125 by the auxiliary bracket 127, a portion to which the mirror neck 111 is fastened is open in cross-section.

Since the portion to which the mirror neck 111 is fastened is open in cross-section, it is difficult for the portion to exhibit rigidity. For this reason, the panels are made thick, which causes an increase in weight. In addition, the portion to which the mirror neck 111 is fastened is vulnerable to vibration due to the open cross-sectional structure thereof.

Figure 4:
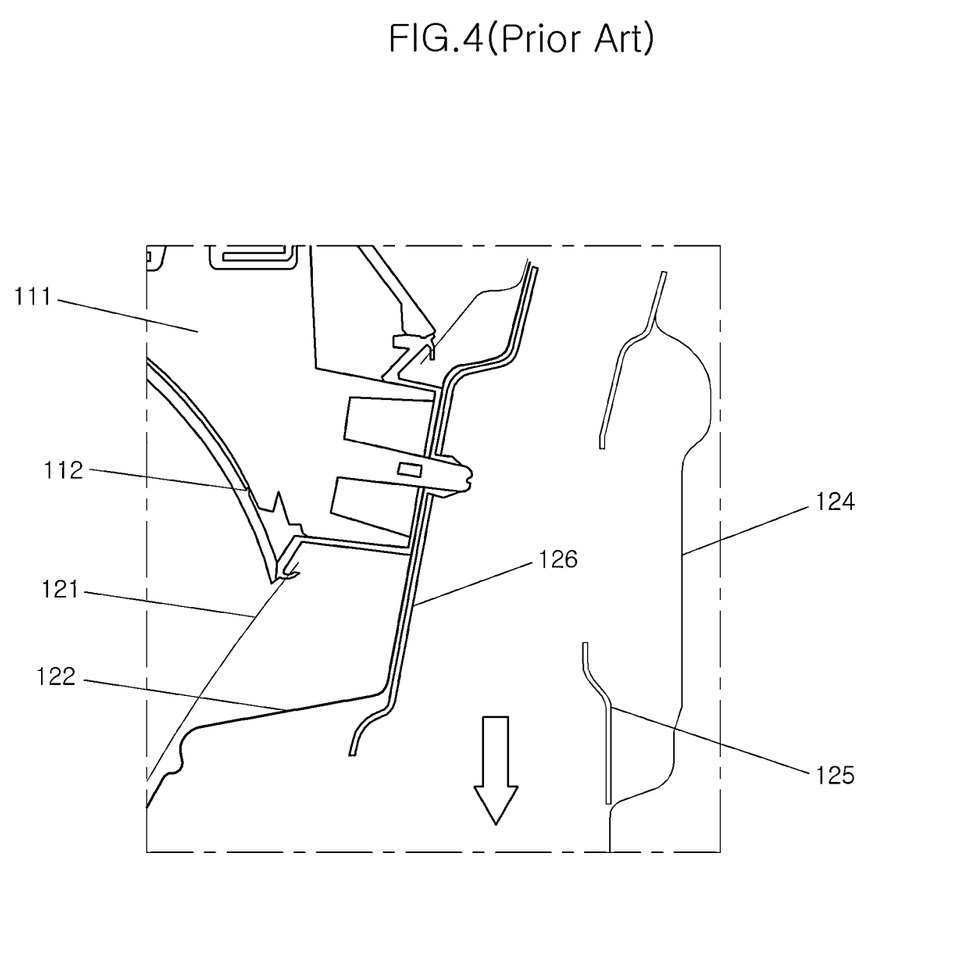
FIG. 4 is a cross-sectional view taken along line B-B of FIG. 2.
Figure 5:
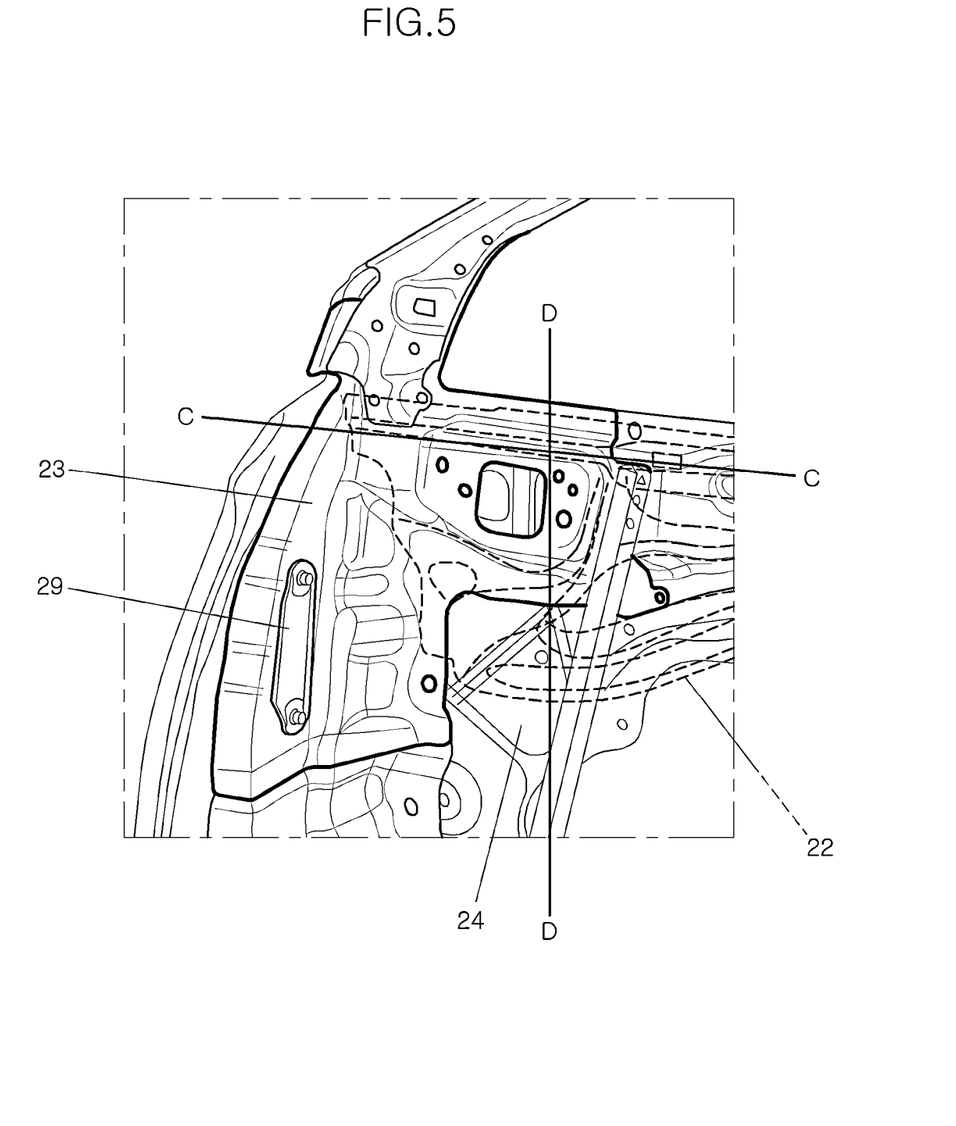
FIG. 5 is a perspective view illustrating a portion to which a structure for mounting a flag-type side mirror according to one form of the present disclosure is applied.

We have discovered that since the fastening bolt is fastened from the outside of the vehicle, a mirror neck cover 112 is desired to cover the fastening bolt. For example, when a portion to which the side mirror 110 is fastened is open downward in cross-section as illustrated in FIG. 4, if a fastening nut falls in the direction of the arrow in FIG. 4 during the fastening of the side mirror 110, it is difficult to collect the fastening nut. Furthermore, the side mirror 110 is typically fastened at the end of the assembly of the door, and thus if the fastening nut falls, all assembled parts must be removed.

SUMMARY

The present disclosure provides a structure and method for mounting a flag-type side mirror, capable of allowing a portion to which a mirror neck is fastened to be closed in cross-section to exhibit sufficient rigidity.

The present disclosure provides a structure and method for mounting a flag-type side mirror, capable of achieving a reduction in weight and an improvement in quality due to a reduction in the number of parts and panel thickness.

Other objects and advantages of the present disclosure can be understood by the following description, and become apparent with reference to the forms of the present disclosure. Also, it is obvious to those skilled in the art to which the present disclosure pertains that the objects and advantages of the present disclosure can be realized by the means as claimed and combinations thereof.

In accordance with one form of the present disclosure, a structure for mounting a flag-type side mirror for a vehicle includes: a mirror neck of the flag-type side mirror which is fastened to a door of the vehicle, where the door is formed by a plurality of panels bonded to each other, wherein the mirror neck has an end fastened to one panel among the plurality of panels of the door, and a portion of the panel to which the mirror neck is fastened is circumferentially bonded to another panel of the plurality of panels of the door.

The mirror neck may be fastened to a quadrant reinforce for reinforcing strength of a front end of the door, and a portion of the quadrant reinforce to which the mirror neck is fastened may be circumferentially bonded to an inner panel of the door.

The portion of the quadrant reinforce to which the mirror neck is fastened may be bonded, at front and rear ends thereof, to the inner panel.

The portion of the quadrant reinforce to which the mirror neck is fastened may have bent portions formed at positions spaced at predetermined distances from the respective front and rear ends of thereof.

The portion of the quadrant reinforce to which the mirror neck is fastened may be bonded, at upper and lower ends thereof, to the inner panel, respectively.

The portion of the quadrant reinforce to which the mirror neck is fastened may be convex outward of the vehicle, and the convex outward portion of the quadrant reinforce may be circumferentially bonded to the inner panel.

In one form, an outer belt rail is bonded to an upper portion of an outer panel of the door in a longitudinal direction of the vehicle, and the outer belt rail may be interposed between the end of the mirror neck and the quadrant reinforce.

The quadrant reinforce may be bonded to the outer belt rail.

The outer belt rail, the quadrant reinforce, and the inner panel may be formed with through-holes, respectively, through which a wiring passes.

The mirror neck may pass through an outer panel of the door so that the end of the mirror neck is fastened to the quadrant reinforce.

A fastening bolt having passed through the inner panel may be fastened to the end of the mirror neck through the quadrant reinforce.

In accordance with another form of the present disclosure, there is provided a method of mounting a flag-type side mirror to a door of a vehicle, where a mirror neck of the flag-type side mirror is fastened to the door formed by a plurality of panels bonded to each other. The method includes: passing a wiring mounted to the flag-type side mirror through through-holes formed in an outer belt rail, a quadrant reinforce, and an inner panel of the door; placing the flag-type side mirror at a position to be installed; arranging the mirror neck of the flag-type side mirror to abut on the quadrant reinforce through an outer panel of the door; and passing a fastening member through the outer belt rail and the quadrant reinforce; and fastening the fastening member to an end of the mirror neck by operating a tool in a direction from inside to outside of the vehicle.

The method may further include, after the fastening a fastening member is performed, fixing the wiring by mounting a grommet provided in the wiring to one side of the door.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure will be described below in more detail with reference to the accompanying drawings. The present disclosure may, however, be embodied in different forms and should not be construed as limited to the forms set forth herein. Rather, these forms are provided so that this disclosure will be thorough and complete, and will fully convey the scope of the present disclosure to those skilled in the art. Throughout the disclosure, like reference numerals refer to like parts throughout the various figures and forms of the present disclosure.

Hereinafter, a structure and method for mounting a flag-type side mirror according to the present disclosure will be described in detail with reference to the accompanying drawings.

In the structure for mounting a flag-type side mirror, a mirror neck 11 of the flag-type side mirror is fastened to a door 20 of a vehicle, where the door is formed with a plurality of panels bonded to each other, and the mirror neck 11 has an end fastened to one panel among the plurality of panels of the door 20 and a portion of the panel to which the mirror neck 11 is fastened is circumferentially bonded to another panel of the plurality of panels of the door 20.

The plurality of panels forming the door structure for the door 20 includes: an outer panel 21, an inner panel 24, and a panel for reinforcing the strength of the door 20. These panels are bonded to each other by welding W to form a basic door structure.

The outer panel 21 and the inner panel 24 are provided, at the respective upper ends thereof, with an outer belt rail 22 and an inner belt rail (not illustrated) in the longitudinal direction of the vehicle for strength reinforcement.

A quadrant reinforce 23 is provided between the inner panel 24 and the outer belt rail 22 to reinforce the strength of the front end of the door 20.

In the flag-type side mirror 10, the end of the mirror neck 11 is fastened to one of the plurality of panels of the door 20.

A portion adjacent to the end of the mirror neck 11 passes through the outermost panel, namely the outer panel 21, of the door 20 so that the end of the mirror neck 11 is fastened to one of the plurality of panels of the door 20.

In particular, the panel to which the mirror neck 11 is fastened is circumferentially bonded to an adjacent another panel. The panel to which the mirror neck 11 is fastened is circumferentially bonded to another panel adjacent to the panel, so that a portion of the panel to which the mirror neck 11 is fastened is closed in cross-section to have improved rigidity.

The panel to which the mirror neck 11 is fastened may be the quadrant reinforce 23, and the panel abutting on the quadrant reinforce 23 may be the inner panel 24.

Specifically, the mirror neck 11 is fastened to the quadrant reinforce 23 for reinforcing the front structure of the door 20, and a portion of the quadrant reinforce 23 to which the mirror neck 11 is fastened is circumferentially bonded to the inner panel 24.

The portion of the quadrant reinforce 23 to which the mirror neck 11 is fastened is convex outward of the vehicle, and the convex outward portion is circumferentially bonded to the outer surface of the inner panel 24.

Since the portion of the quadrant reinforce 23 to which the mirror neck 11 is fastened is circumferentially bonded to the inner panel 24, the portion of the quadrant reinforce 23 to which the mirror neck 11 is fastened is closed in cross-section, which has improved rigidity for supporting the mirror neck 11 compared to when it is open in cross-section.

The portion of the quadrant reinforce 23 bonded to the inner panel 24 will be described in detail.

Figure 6:
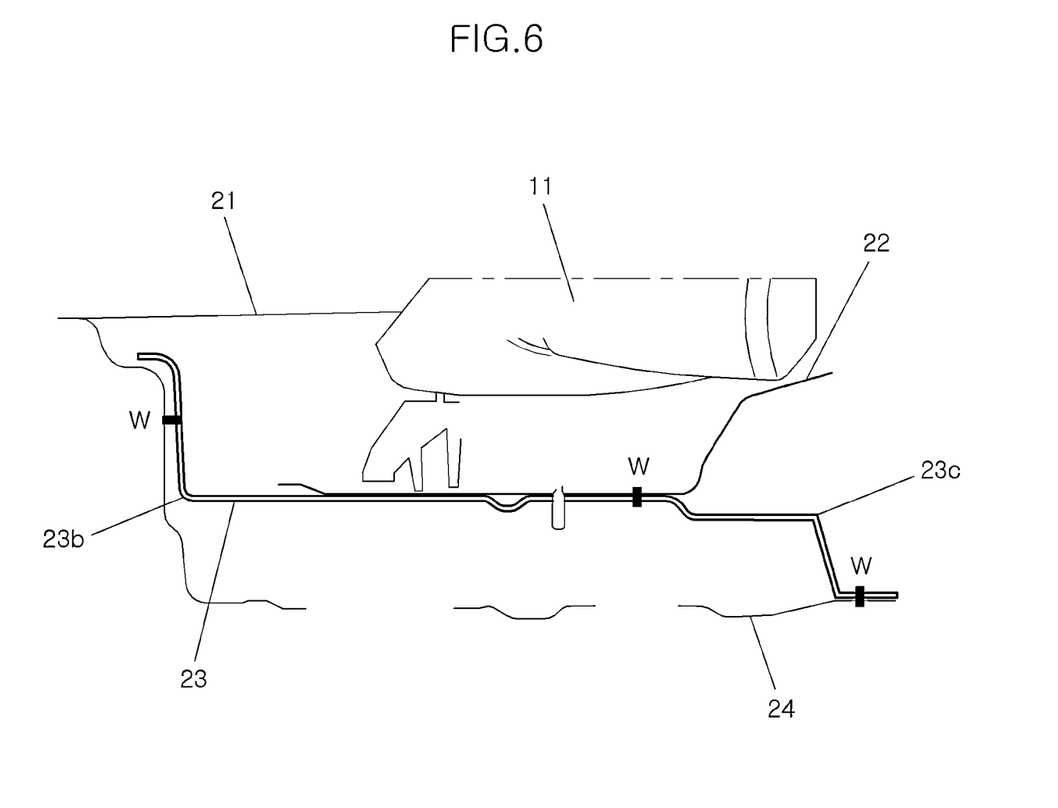
FIG. 6 is a cross-sectional view taken along line C-C of FIG. 5.

The portion of the quadrant reinforce 23 to which the mirror neck 11 is fastened is bonded, at the front and rear ends thereof (based on the front-to-rear direction of the vehicle), to the inner panel 24. Particularly, the portion of the quadrant reinforce 23 to which the mirror neck 11 is fastened has bent portions 23b and 23c formed at positions spaced at predetermined distances from the respective front and rear ends of thereof. That is, as illustrated in FIG. 6, the horizontal portion of the quadrant reinforce 23 to which the mirror neck 11 is fastened is closed in cross-section to have improved rigidity.

Figure 7:
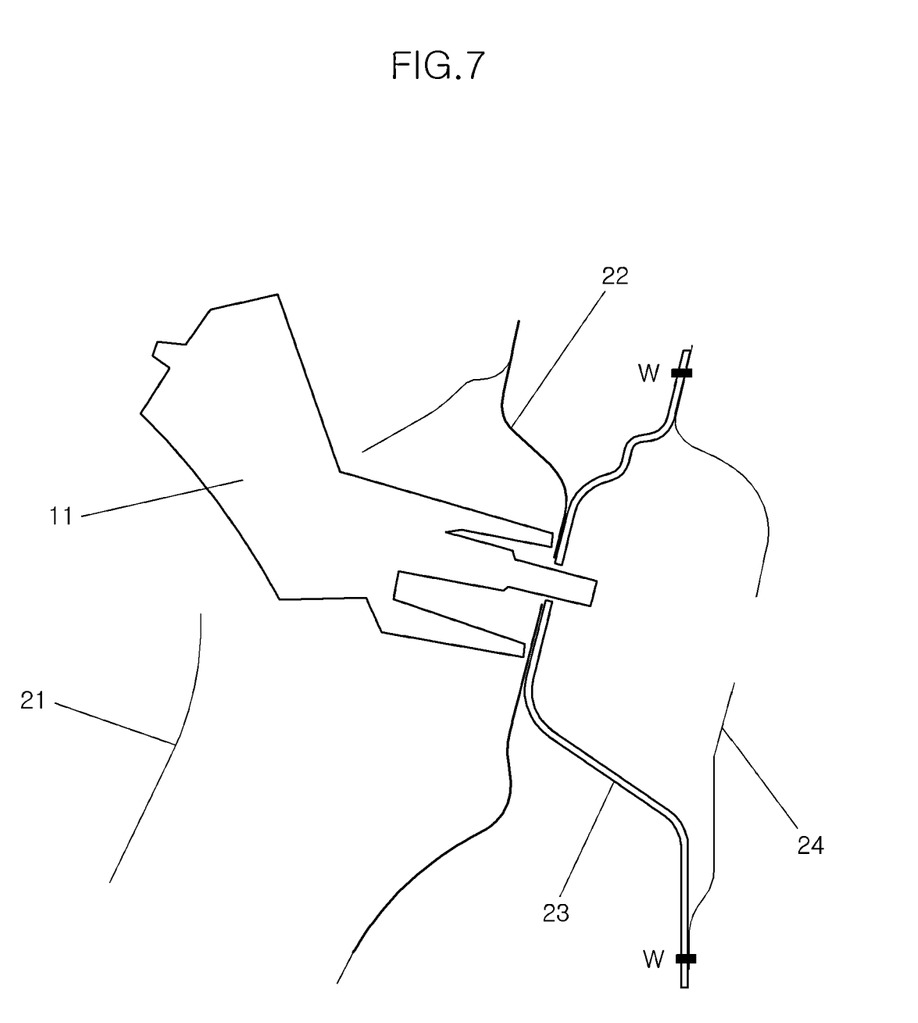
FIG. 7 is a cross-sectional view taken along line D-D of FIG. 5.

In addition, the portion of the quadrant reinforce 23 to which the mirror neck 11 is fastened is bonded, at the upper and lower ends thereof (based on the vertical direction of the vehicle), to the inner panel 24 (see FIG. 7). The vertical portion of the quadrant reinforce 23 to which the mirror neck 11 is fastened is closed in cross-section.

Figure 8:
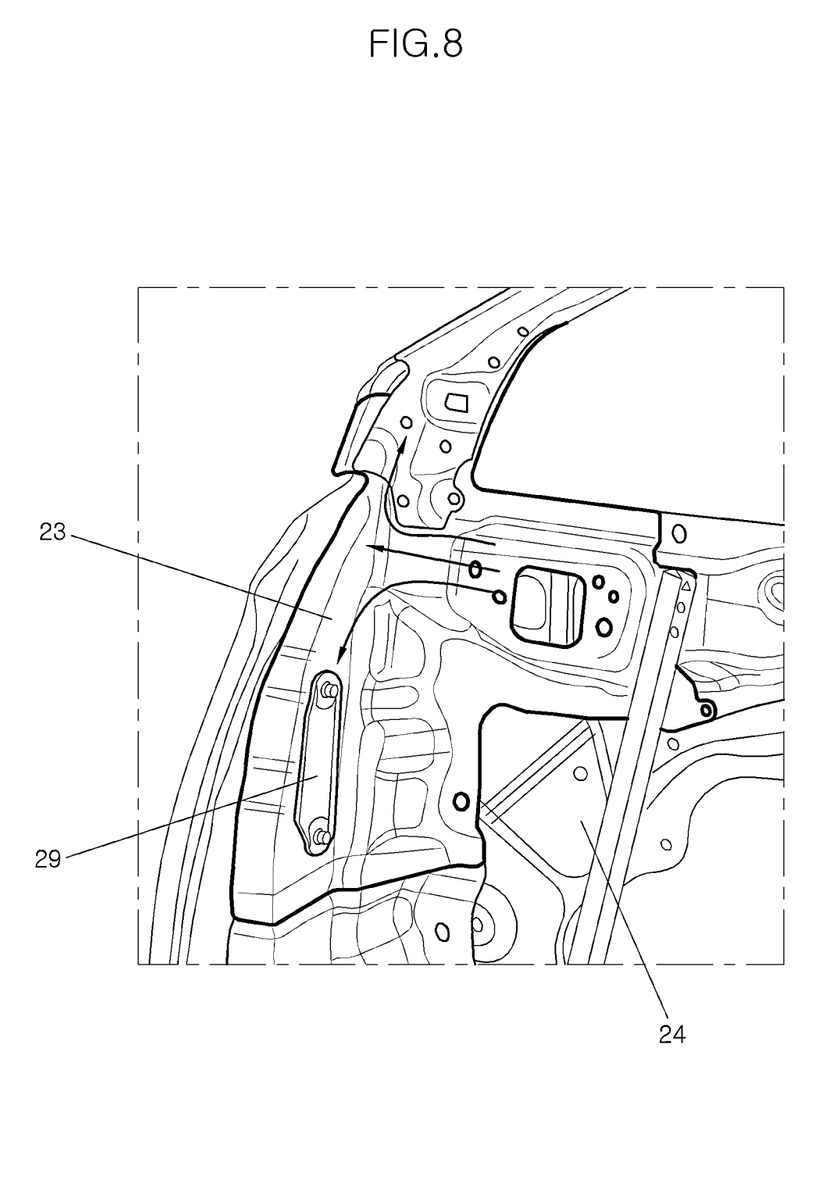
FIG. 8 is a perspective view illustrating a load path in the structure for mounting a flag-type side mirror according to one form of the present disclosure.

Particularly, the portion of the quadrant reinforce 23 to which the mirror neck 11 is fastened is closed in cross-section, thereby defining a load path as indicated by the arrow in the FIG. 8. A door hinge 29 is installed at a portion of the door 20 fastened to the mirror neck 11 so that the load path is defined at a portion in which the door 20 is hinged to a vehicle body, thereby improving connection rigidity.

In addition, since the portion to which the mirror neck 11 is fastened is closed in cross-section to secure rigidity, the conventional mirror bracket or auxiliary bracket may be removed therefrom.

Moreover, since the portion to which the mirror neck 11 is fastened is closed in cross-section to have improved rigidity, the panels positioned at the portion can be reduced in thickness, resulting in a reduction in the weight of the vehicle.

Furthermore, due to the strong fastening of the side mirror 10, the vibration of the side mirror 10 can be reduced when the door 120 is opened or closed or while the vehicle is traveling at a high speed.

Figure 9:
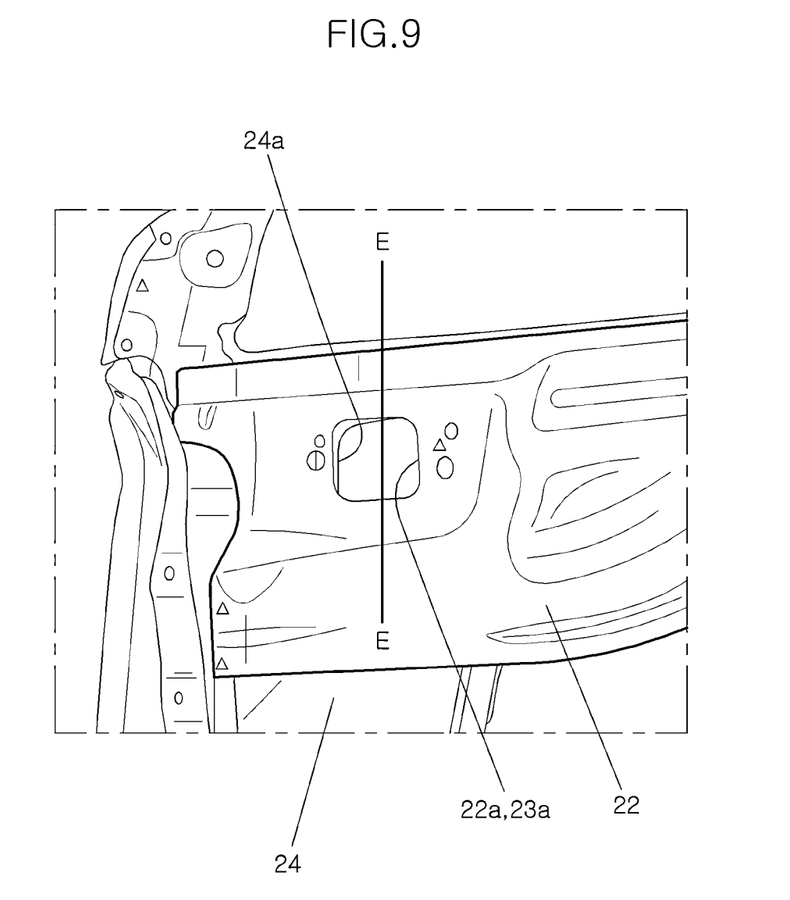
FIG. 9 is a perspective view illustrating a state in which a through-hole is formed in the structure for mounting a flag-type side mirror according to one form of the present disclosure.
Figure 10:
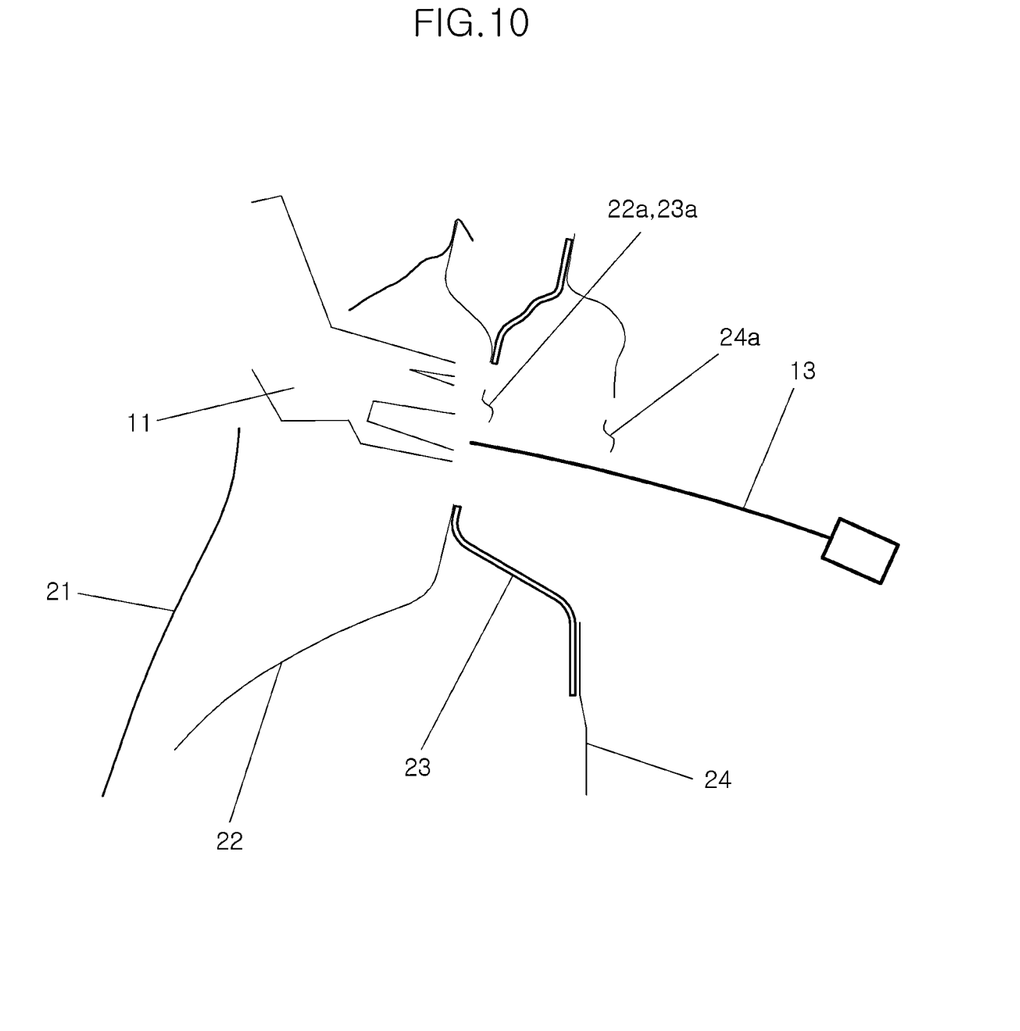
FIG. 10 is a cross-sectional view taken along line E-E of FIG. 9.
Figure 11A:
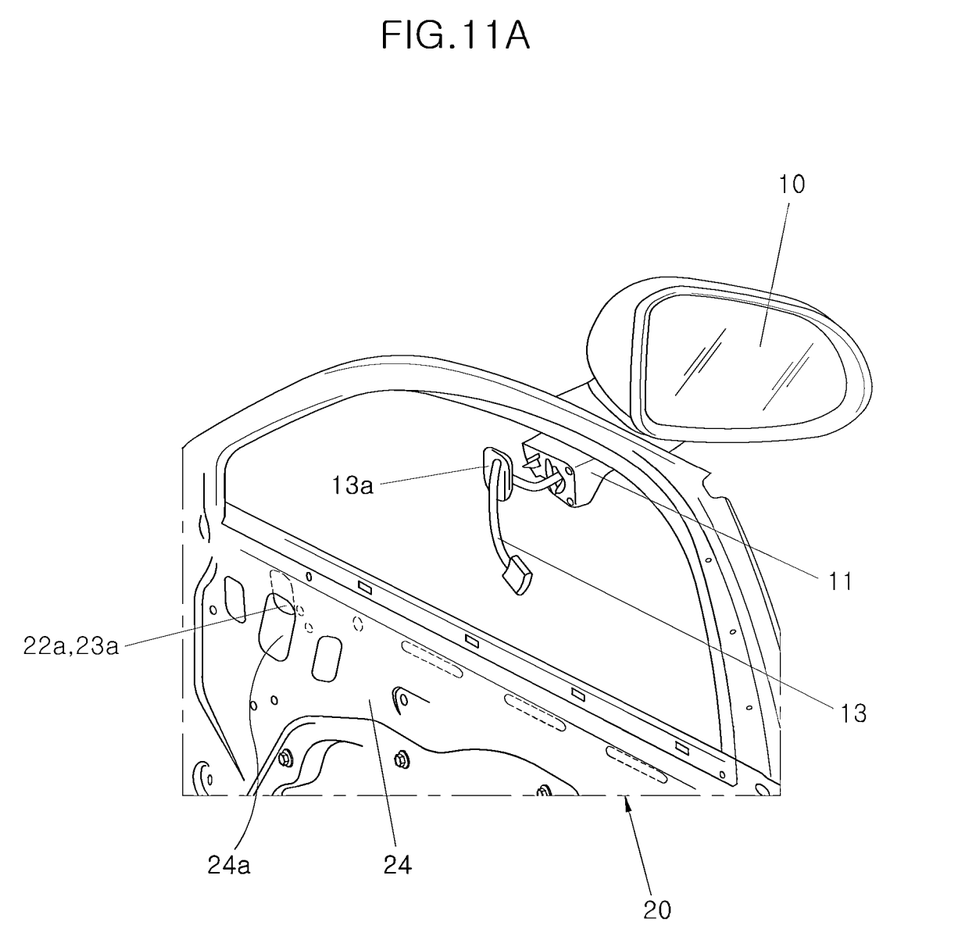
FIGS. 11A and 11B are perspective views sequentially illustrating a method of mounting a flag-type side mirror according to one form of the present disclosure.
Figure 11B:
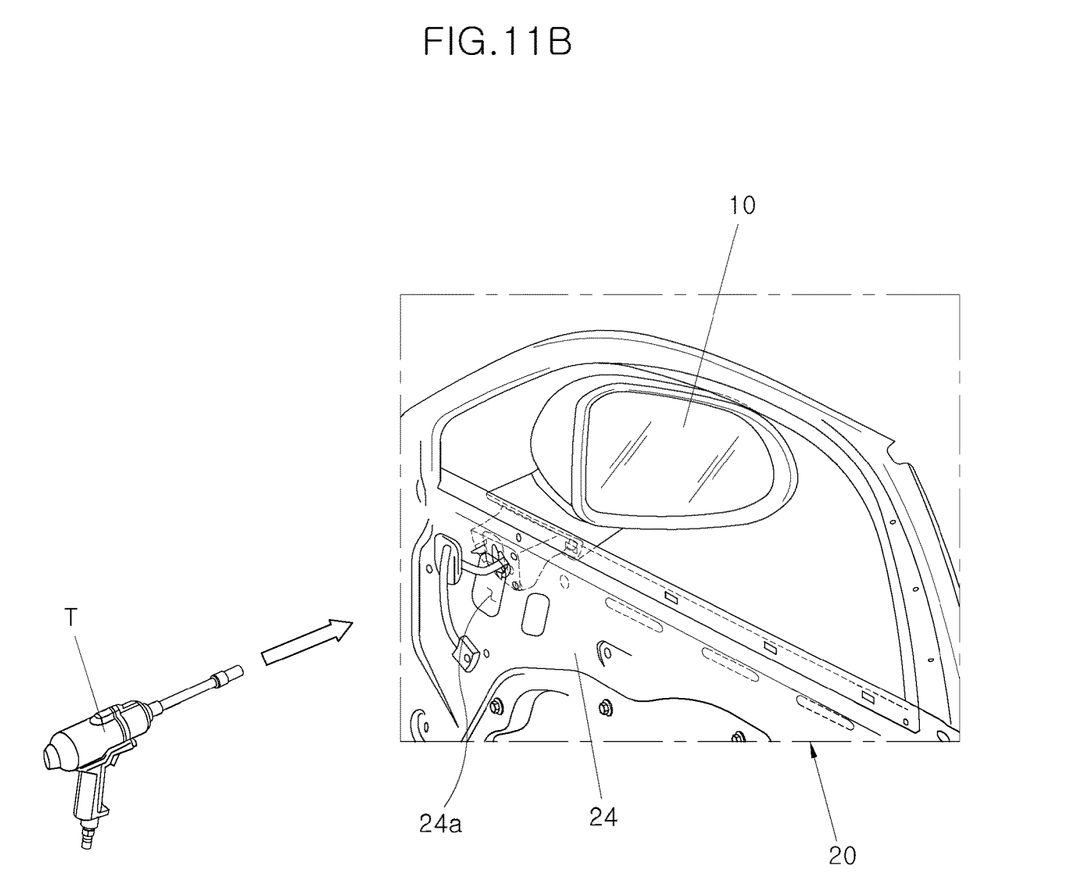

The side mirror 10 is equipped with a heating wire, an angle adjustment motor, a rear lateral warning lamp, and the like, and includes a wiring 13 for operating them. To connect the wiring 13 to a connector positioned within the door 20, the outer belt rail 22, the quadrant reinforce 23, and the inner panel 24 have through-holes 22a, 23a, and 24a, respectively, through which the wiring 13 passes (see FIG. 9).

In addition, the outer belt rail 22 and the quadrant reinforce 23 have fastening holes (not illustrated) through which the fastening member passes.

Figure 12:
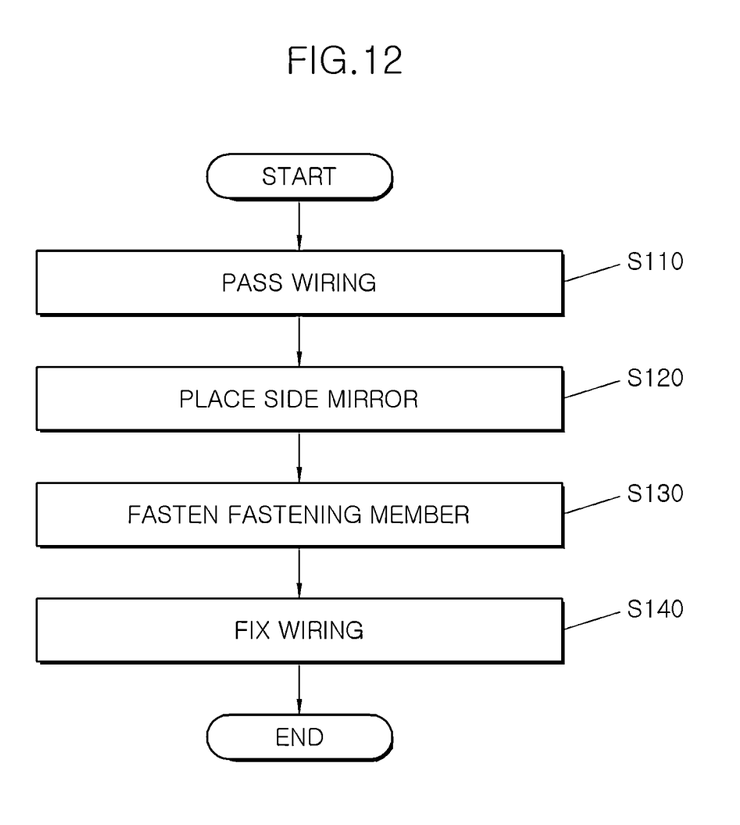
FIG. 12 is a flowchart illustrating the method of mounting a flag-type side mirror according to another form of the present disclosure.

FIG. 12 illustrates a method of mounting a flag-type side mirror according to the present disclosure.

The method of mounting a flag-type side mirror according to the present disclosure includes a step of passing a wiring 13 mounted to a side mirror 10 through through-holes 22a, 23a, and 24a formed in an outer belt rail 22, a quadrant reinforce 23, and an inner panel 24 (S110), a step of placing the side mirror 10 at a position to be installed such that a mirror neck 11 of the side mirror 10 abuts on the quadrant reinforce 23 through an outer panel 21 (S120), and a step of fastening a fastening member, having passed through the outer belt rail 22 and the quadrant reinforce 23, to an end of the mirror neck 11 by operating a tool in a direction from inside to outside of a vehicle (S130).

In step S110, the wiring 13 mounted to the side mirror 10 passes through the constituent panels of a door 20. The constituent panels of the door 20, particularly, the outer belt rail 22, the quadrant reinforce 23, and the inner panel 24 are formed with the through-holes 22a, 23a, and 24a, respectively, through which the wiring 13 passes. The wiring 13 passes through the through-holes 22a, 23a, and 24a in the direction from outside to inside of the door, i.e., in the direction toward the inner panel 24 from the outer panel 21.

In step S120, the side mirror 10 is placed at a position to be fastened. The front end of the mirror neck 11 of the side mirror 10 is positioned at the fastening portion of the quadrant reinforce 23 through the outer panel 21.

In step S130, the fastening member is fastened in the direction from inside to outside of the door, i.e., in the direction toward the outer panel 21 from the inner panel 24. By fastening the end of the fastening member to the end of the mirror neck 11 through the fastening holes formed in the quadrant reinforce 23 and the outer belt rail 22 using the tool T, the side mirror 10 is fastened by the fastening member. In one form, the fastening member is a fastening bolt.

In this case, even when the fastening bolt falls during the fastening of the side mirror 10, the fastening bolt does not fall to the bottom of the door but remains between the quadrant reinforce 23 and the outer belt rail 22 since the quadrant reinforce 23 and the outer belt rail 22 are circumferentially bonded to each other. Therefore, the fastening bolt may be used for refastening after it is easily removed.

In addition, since the fastening of the side mirror 10 is performed inside the door 20, a mirror neck cover for covering the mirror neck 11 is unnecessary. Moreover, since a door trim or the like is finally mounted inside the door 20, a separate finishing operation for covering the fastening member is not required.

As described above, when the fastening of the side mirror 10 is completed, a step of fixing the wiring (S140) is performed so that a grommet 13a installed in the middle of the wiring 13 is fixed to one of the panels of the door 20, e.g., the inner panel 24 to place the wiring 13 at a predetermined position.

In accordance with the structure and method for mounting a flag-type side mirror of the present disclosure having the above configuration, the portion to which the side mirror neck is fastened can be closed in cross-section to have improved rigidity.

Since a mirror bracket, an auxiliary bracket, a mirror neck cover, etc. are unnecessary, the panel such as the outer belt rail can be reduced in thickness, thereby reducing weight and cost.

Since the side mirror can be mounted from the inside of the door, it is possible to reduce the number of processes and improve productivity compared to the assembly from the outside of the door.

While the present disclosure has been described with respect to the specific forms, it will be apparent to those skilled in the art that various changes and modifications may be made without departing from the spirit and scope of the disclosure.

What is claimed is:

1. A method of mounting a flag-type side mirror to a door of a vehicle, where a mirror neck of the flag-type side mirror is fastened to the door formed by a plurality of panels bonded to each other, the method comprising:

passing a wiring mounted to the flag-type side mirror through through-holes formed in an outer belt rail, an inner panel of the door, and a quadrant reinforce provided between the inner panel of the door and the outer belt rail;

placing the flag-type side mirror at a position to be installed;

arranging the mirror neck of the flag-type side mirror to abut on a convex portion of the quadrant reinforce through an outer panel of the door, wherein the convex portion bulges outward towards the outer panel;

circumferentially bonding the convex portion of the quadrant reinforce to the inner panel to form a closed cross-section;

passing a fastening member through the outer belt rail and the quadrant reinforce; and     fastening the fastening member to an end of the mirror neck by operating a tool in a direction from inside to outside of the vehicle.

2. The method of claim 1, further comprising, after fastening the fastening member is performed, fixing the wiring by mounting a grommet provided in the wiring to one side of the door.

* * * * *